May 13, 1952
C. S. BRANDVOLD
2,596,096
AUTO TIRE NONSKID DEVICE
Filed Dec. 21, 1950
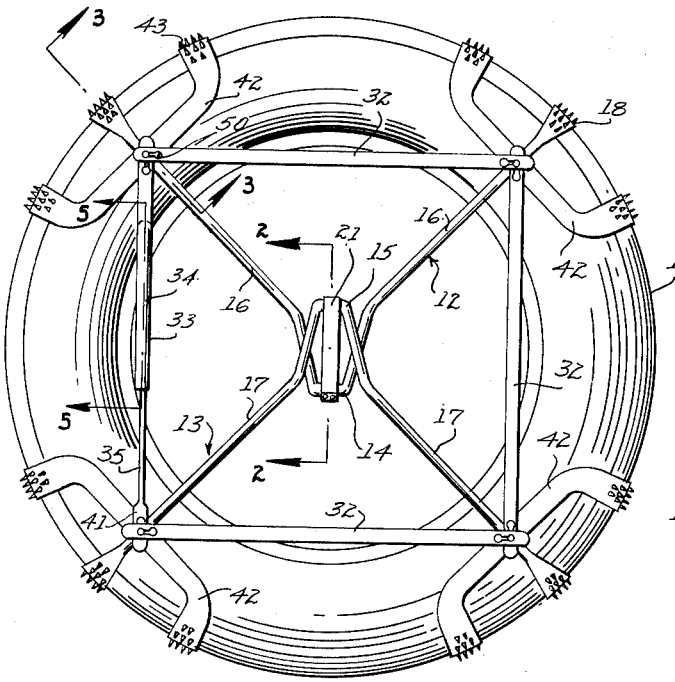
INVENTOR.
CARL S. BRANDVOLD
BY
McMorrow, Berman + Davidson
ATTORNEYS Patented May 13, 1952

2,596,096

UNITED STATES PATENT OFFICE 2,596,096

AUTO TIRE NONSKID DEVICE

Carl S. Brandvold, Cut Bank, Mont.

Application December 21, 1950, Serial No. 202,101

4 Claims. (Cl. 152—218)

This invention relates to traction devices, and more particularly to a device for installation on a conventional automobile wheel to provide improved traction therefor.

The main object of the invention is to provide a novel and improved traction assembly for installation on a conventional automobile wheel, said assembly involving relatively simple parts, being easy to install on a wheel, and being adapted to be installed without requiring the wheel to be jacked up.

A further object of the invention is to provide an improved traction device for an automobile wheel, said device being inexpensive to manufacture, being rugged in construction, and being engageable on a wheel in a secure fashion, whereby the device will remain in operating position on the wheel at all times after the installation thereof.

Further objects and advantages of the invention will become apparent from the following description and claims, and from the accompanying drawings, wherein:

Figure 1 is a side elevational view of a conventional automobile tire showing an improved traction device according to the present invention installed thereon;

Figure 2 is an enlarged, cross-sectional, detail view taken on line 2—2 of Figure 1;

Figure 3 is a cross-sectional view taken on line 3—3 of Figure 1;

Figure 4 is a perspective, detail view of one of the auxiliary shoe elements of the traction device of Figure 1;

Figure 5 is an enlarged, cross-sectional, detail view taken on line 5—5 of Figure 1;

Figure 6 is an enlarged, cross-sectional, detail view taken on line 6—6 of Figure 3;

Figure 7 is an enlarged, perspective, detail view of the flanged securing pin to which the tie links of the traction device of Figure 1 are secured.

Referring to the drawings, and more particularly to Figure 1, 11 designates a conventional automobile tire on which is mounted an improved traction assembly according to the present invention, as shown. The traction assembly comprises a pair of generally U-shaped frame members 12 and 13 arranged in opposing relation with the bight portion 14 of the member 12 arranged in overlapping relationship with respect to the bight portion 15 of the member 13. As shown in Figure 2, the bight portion 15 is inwardly offset with respect to the plane of the member 13, and the bight portion 14 is inwardly offset with respect to the plane of the member 12, whereby the bight portions 14 and 15 extend in a plane substantially parallel to the planes of the members 12 and 13 and located midway between the planes of the members 12 and 13. As shown in Figure 1, the arms of the frame member 12, designated at 16, 16, are preferably at right angles to each other, and the arms of the member 13, designated at 17, 17 are likewise preferably at right angles to each other, whereby the arms 16, 16 and 17, 17 may be arranged on an automobile tire at equal angular spacings successively around the tire.

Each of the arms 16, 16 and 17, 17 is formed at its outer end with a transversely extending hook-like shoe member 18 shaped to engage transversely over the tread of the tire 11, as shown in Figure 3, and to engage the inner side of the tire with the inturned end portion 19 thereof. The outer surface of the shoe member 19 may be suitably roughened or may be provided with the outwardly projecting caulks 20 providing a tractive, ground-engaging surface.

The bight portions 14 and 15 are urged apart by a spring device designated generally at 21. The device 21 may comprise a tubular housing 22 which has a grooved plunger 23 slidably mounted in one end, the housing 22 being formed with opposing longitudinal slots 24 opening at said one end. The plunger 23 is formed with the V-shaped groove 25 and the bight portion 15 is formed with the V-shaped bottom surface 26 which engages in the groove 25. As shown in Figure 2, the bight portion 15 is slidable in the opposed longitudinal slots 24. Designated at 27 is a stationary abutment member secured in the opposite end of the tubular member 22 and which is grooved to receive the bight portion 14, as shown. The end of the member 22 is formed with opposed slots 28 through which the bight portion 14 may be passed when said bight portion is being received in the abutment member 27. Designated at 29 is a cap member which is insertable in the end of the tubular member 22 and which is secured therein in covering relationship to the bight portion 14, as by the machine screws 30 which extend through the wall of member 22, the wall of cap member 29, and into threaded engagement with the abutment member 27. Designated at 31 is a coil spring which is positioned inside the tubular member 22 and bears at one end on the abutment member 27 and at the other end on the plunger 23, biasing the plunger away from the abutment member 27 and thereby urging the bight portion 15 away from the bight portion 14.

It will be readily apparent that the device as described above may be assembled on the tire 11 by first engaging the shoe elements of the frame member 13 beneath the tire and then engaging the shoe elements 18 of the frame member 12 on the top surfaces of the tire, exerting upward force on the frame member 12 against the pressure of the spring device 21. After the shoe elements 18 of the frame members 13 and 12 have been engaged on the tire, as above described, the spring device 21 exerts resilient clamping action on the shoe elements because of the action of coil spring 31.

As shown in Figure 1, the frame members 12 and 13 may be secured against rotation relative to each other by tie bars 32 connecting the arms 16, 16 and 17, 17 at points adjacent the shoe elements 18. The tie or links bars may include one or more expansible link members 33. The expansible link member 33 comprises a sleeve member 34 and a rod member 35 extending axially into said sleeve member. Designated at 36 is a coil spring surrounding the inner end of the rod member 35 and bearing at one end on the end wall 37 of the sleeve member 34, and at the other end on a washer 38 which surrounds the end portion of the rod member 35 and which is restrained against separation from the rod member by a nut 39 threaded on the end of the rod member. As shown in Figure 5, the sleeve member 34 has a flattened, apertured end 40 employed for securing the sleeve member to an arm 16 or 17, and the rod member 35 has an apertured flattened end 41 for a similar purpose.

Designated at 42 are auxiliary bar members formed at their ends with transversely extending shoe elements 43 shaped to engage over the tread of the tire 11, the bar member 42 being pivotally secured at its center to the arm 16 or 17 of the associated frame member 12 or 13. In the arrangement disclosed in Figure 1, a bolt member 44 extends through the arm 16 or 17, said bolt member being provided with a cylindrical bearing portion 45 which is rotatably received in the central aperture of the plate member 42. Designated at 46 is a nut member which is threaded on the bolt 44 and which is provided at one end with a circular flange 47 adapted to abut the bearing portion 45. The nut 46 is formed at its opposite end with the hexagonal flange 48 and has a squared shank portion 49 between flanges 47 and 48. The link bars 32 and 33 are formed at their ends with keyhole slots 50 adapted to engage on the shank portions 49, holding the link bars in right angled relation due to the keying of the narrow portions of the slots 50 with the squared shank 49.

It will be apparent that the auxiliary members 42 may pivot freely around the bolt 44, in accordance with the deformation of the tire tread as the tire rolls over the ground. The link bars 32 and 33 retain the frame members 12 and 13 in substantially opposed relationship at all times and prevent the shoe elements 43 and 18 from shifting from their initial relative positions.

In mounting the device, the frame members 12 and 13 are first engaged on the tire in the manner above described, the auxiliary traction members 42 are then engaged on the bolts 44 and the link bars 32 and 33 are then secured on the squared shank portions of the nut members 46. It will be further apparent that the traction device may be assembled on the tire 11 without requiring the tire to be jacked up, and similarly, the traction device may be readily removed from the tire when its use is no longer required, without requiring the wheel to be jacked up or otherwise elevated.

While a specific embodiment of an improved traction device for an automobile wheel has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A traction device for a motor vehicle wheel having an outer peripheral tread comprising a pair of substantially U-shaped frame members each having a pair of side arms and a bight portion connecting said side arms, said frame members being arranged in opposing relation with their bight portions overlapping, respective hook-like shoe members rigidly carried at the ends of the side arms of the frame members and arranged to engage transversely over the tread of the motor vehicle wheel, each shoe member being provided with a roughened ground-engaging outer surface, and spring means mounted between the bight portions of said frame members and urging said bight portions apart, whereby inward clamping pressure is exerted on the tread of the vehicle wheel by said shoe members.

2. A traction device for a motor vehicle wheel having an outer peripheral tread comprising a pair of substantially U-shaped frame members each having a pair of side arms and a bight portion connecting said side arms, said frame members being arranged in opposing relation with their bight portions overlapping, whereby said side arms extend outwardly and are arranged in successive sequence around the overlapping bight portions, respective hook-like shoe members rigidly carried at the ends of the side arms of the frame members and arranged to engage transversely over the tread of the motor vehicle wheel, each shoe member being provided with a roughened ground-engaging outer surface, spring means mounted between the bight portions of said frame members and urging said bight portions apart, whereby inward clamping pressure is exerted on the tread of the vehicle wheel by said shoe members, and respective link bars connecting the succesive arms of the frame members.

3. A traction device for a motor vehicle wheel having an outer peripheral tread comprising a pair of substantially U-shaped frame members each having a pair of side arms and a bight portion connecting said side arms, said frame members being arranged in opposing relation with their bight portions overlapping, whereby said side arms extend outwardly and are arranged in successive sequence around the overlapping bight portions, respective hook-like shoe members rigidly carried at the ends of the side arms of the frame members and arranged to engage transversely over the tread of the motor vehicle wheel, each shoe member being provided with a roughened ground-engaging outer surface, spring means mounted between the bight portions of said frame members and urging said bight portions apart, whereby inward clamping pressure is exerted on the tread of the vehicle wheel by said shoe members, and respective link bars connecting the successive arms of the frame members, at least one of said link bars comprising a sleeve member, a rod element slidably mounted in said sleeve member, and spring means urging the rod element inwardly with respect to the sleeve member.

4. A traction device for a motor vehicle wheel having an outer peripheral tread comprising a pair of substantially U-shaped frame members each having a pair of side arms and a bight portion connecting said side arms, said frame members being arranged in opposing relation with their bight portions overlapping, whereby said side arms extend outwardly and are arranged in successive sequence around the overlapping bight portions, respective hook-like shoe members rigidly carried at the ends of the side arms of the frame members and arranged to engage transversely over the tread of the motor vehicle wheel, each shoe member being provided with a roughened ground-engaging outer surface, spring means mounted between the bight portions of said frame members and urging said bight portions apart, whereby inward clamping pressure is exerted on the tread of the vehicle wheel by said shoe members, respective link bars connecting the successive arms of the frame members, and respective auxiliary bar members pivoted at their intermediate portions to the respective successive arms of the frame members, each auxiliary bar member being formed at its opposite ends with auxiliary transversely extending shoe elements arranged to engage over the wheel tread, said auxiliary shoe elements being provided with roughened ground-engaging outer surfaces.

CARL S. BRANDVOLD.

REFERENCES CITED

The following references are of record in the file of this patent:

UNITED STATES PATENTS

| Number | Name | Date |
|---|---|---|
| 2,426,683 | Harrop | Sept. 2, 1947 |
| 2,453,611 | Zimmer | Nov. 9, 1948 |